Oct. 14, 1952     E. G. FIPPINGER     2,613,553
SAW SETTING TOOL
Filed May 24, 1951

INVENTOR.
Elmer G. Fippinger
BY
His ATTORNEY.

Patented Oct. 14, 1952

2,613,553

UNITED STATES PATENT OFFICE 2,613,553

SAW SETTING TOOL

Elmer G. Fippinger, Forest Park, Ill.

Application May 24, 1951, Serial No. 228,016

1 Claim. (Cl. 76—71)

This invention relates to new and useful improvements in saw setting tools. It has for its principal object to provide a single inexpensively constructed and effective tool which may be used to properly and conveniently set the teeth of a saw.

It is a well-known fact in the art that unevenly set teeth of a saw blade place a greater strain on some teeth than on others and may ultimately cause them to break. Too great a set not only places unnecessary strain on the rim of the saw, resulting in cracked gullets or broken teeth, but it also will cause the saw to chatter or vibrate in the cut, causing a rough finish. Not enough set of the saw teeth will cause the saw to bind or jam in the cut. This heats the rim, and gullet cracks appear. It is an object of this invention to provide a saw setting tool wherein each entrance slot of the tool is provided with a tapered entrance or mouth with the degree of taper of one entrance being different from that of the other entrances. By such an arrangement the user may accurately limit the lateral bend of the saw tooth so as to produce a proper angle of the tooth.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
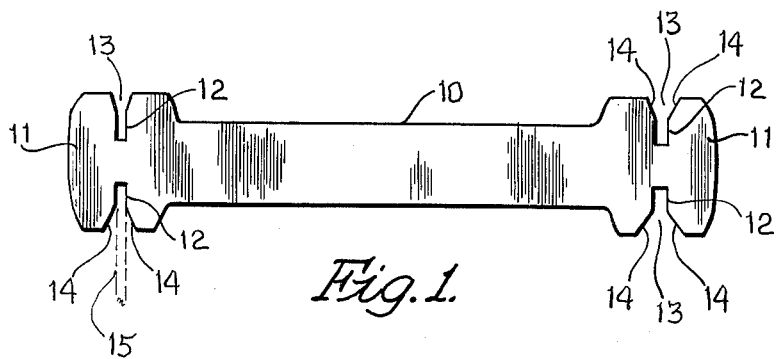
Fig. 1 is a plan view of the invention.
Figure 2:
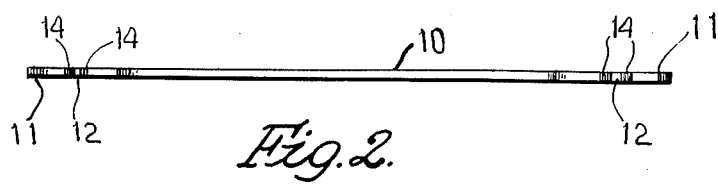
Fig. 2 is a top edge view of the same.

My proposed saw setting tool is preferably formed from a single blank of material shaped to provide a handle or intermediate portion 10 having at opposite end portions integral head portions 11. These head portions 11 each have opposed slots 12 formed therein. Each slot is of a different width to accommodate blades of different degrees. Each slot provides a tapered entrance 13. Each tapered entrance varies in degree of taper so as to accommodate blades requiring different lateral bends. The tapered edges 14 of these entrances provide limiting edges which determine the lateral bend of a saw tooth projected into the slot. This results from the fact that the edge 14 will engage the lateral side of the blade 15 of the saw and thereby limit the lateral bend of the tooth.

From the foregoing it is apparent that I have provided a saw setting tool which is simple in construction and highly efficient in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A saw setting tool comprising an elongated handle portion having at opposite end portions integrally formed enlarged head portions, each of said head portions having formed therein opposed slots of different widths with the entrance of each slot tapered to provide limiting edges adapted to bear against the lateral side of the tooth of a saw projected in the slot whereby to determine the lateral bend of such tooth, the tapered entrances of said slots varying in the angle of taper in proportion to the widths of said slots.

ELMER G. FIPPINGER.

REFERENCES CITED

The following references are of record in the file of this patent:

UNITED STATES PATENTS

| Number | Name | Date |
|---|---|---|
| 1,094,497 | Uhlenkott | Apr. 28, 1914 |
| 1,586,134 | Uhlenkott | May 25, 1926 |

FOREIGN PATENTS

| Number | Country | Date |
|---|---|---|
| 23,445 | Germany | Jan. 18, 1883 |
| 211,006 | Germany | June 19, 1909 |
| 280,835 | Great Britain | Nov. 24, 1927 |